(12) United States Patent
Choi et al.

(10) Patent No.: US 7,813,347 B2
(45) Date of Patent: Oct. 12, 2010

(54) SYSTEM AND METHOD TO ENABLE COMBINATION OF NETWORK CONTROLLED MOBILITY AND UE CONTROLLED MOBILITY BETWEEN DIFFERENT IP VERSIONS

(75) Inventors: Sung-Ho Choi, Suwon-si (KR); O-Sok Song, Suwon-si (KR); Rahul Suhas Vaidya, Bangalore (IN)

(73) Assignee: Samsung Electronics Co., Ltd., Maetan-Dong, Yeongtong-Gu, Suwon-Si, Gyeonggi-Do, Korea (KR)

( * ) Notice: Subject to any disclaimer, the term of this patent is extended or adjusted under 35 U.S.C. 154(b) by 102 days.

(21) Appl. No.: 12/228,921

(22) Filed: Aug. 18, 2008

(65) Prior Publication Data

US 2008/0317064 A1 Dec. 25, 2008

Related U.S. Application Data

(63) Continuation of application No. PCT/KR2007/004601, filed on Sep. 20, 2007.

(30) Foreign Application Priority Data

Sep. 28, 2006 (IN) .................. 1801/CHE/2006

(51) Int. Cl.
*H04L 12/28* (2006.01)
*H04J 3/16* (2006.01)

(52) U.S. Cl. .................. 370/392; 370/401; 370/466

(58) Field of Classification Search ............... 370/392, 370/401, 466

See application file for complete search history.

(56) References Cited

U.S. PATENT DOCUMENTS

| 6,862,274 | B1 | 3/2005 | Tsao et al. ................. 370/338 |
|---|---|---|---|
| 2004/0066759 | A1* | 4/2004 | Molteni et al. ............. 370/329 |
| 2004/0136382 | A1* | 7/2004 | Sundquist .................. 370/400 |
| 2005/0008032 | A1* | 1/2005 | Yamamoto et al. .......... 370/466 |
| 2005/0099976 | A1* | 5/2005 | Yamamoto et al. .......... 370/331 |
| 2007/0088853 | A1* | 4/2007 | Lee et al. ................... 709/249 |
| 2007/0258424 | A1* | 11/2007 | Wable et al. ............... 370/338 |
| 2007/0283149 | A1* | 12/2007 | Devarapalli ................ 713/168 |
| 2008/0013487 | A1* | 1/2008 | Molteni et al. ............. 370/329 |
| 2008/0205653 | A1* | 8/2008 | Haddad .................... 380/278 |
| 2009/0141686 | A1* | 6/2009 | Funabiki et al. ............ 370/331 |
| 2009/0245174 | A1* | 10/2009 | Chen ....................... 370/328 |
| 2009/0316622 | A1* | 12/2009 | Hirano et al. .............. 370/328 |
| 2009/0316623 | A1* | 12/2009 | Pettersson et al. .......... 370/328 |

FOREIGN PATENT DOCUMENTS

| KR | 2006-16496 | 2/2006 |
|---|---|---|
| KR | 2006-70322 | 6/2006 |

* cited by examiner

*Primary Examiner*—Andrew Lee
(74) *Attorney, Agent, or Firm*—Cha & Reiter, LLC

(57) ABSTRACT

The present invention provides session continuity when a User Equipment (UE) moves from one network to another network. A method and system for providing access to nodes supporting, for example, both Internet Protocol Version 4 (IPv4) and Internet Protocol Version (IPv6) on a network supporting only one of the IP versions are provided. In addition, both network based mobility and UE based mobility mechanisms are supported to allow a UE supporting dual stack mobility access to a network supporting only one of IPv4 or IPv6. The invention provides for a reduction of header overhead and signaling overhead.

20 Claims, 7 Drawing Sheets

SYSTEM AND METHOD TO ENABLE COMBINATION OF NETWORK CONTROLLED MOBILITY AND UE CONTROLLED MOBILITY BETWEEN DIFFERENT IP VERSIONS

CLAIM OF PRIORITY

The present application is a continuation of international application PCT/KR2007/004601 filed on Sep. 20, 2007, which in turn claims a priority to an Indian Patent Application 1801/CHE/2006, filed on Sep. 28, 2006.

BACKGROUND OF THE INVENTION

1. Field of the Invention

The present invention relates to the network mobility in the field of mobile communication technologies, providing access to Internet Protocol Version 6 (IPv6) and Internet Protocol Version 4 (IPv4) nodes, when User Equipment (UE) is connected to the network providing access to only one of the IP versions. More particularly, the present invention relates to a system and method to enable combination of network controlled mobility and LE controlled mobility between different IP versions.

2. Description of the Related Art

When a dual stack UE moves into a network that supports only a single IP version, it is necessary to provide support to the UE in order to continue the sessions which were started in either of the IP versions. Dual Stack Mobile Internet Protocol version 6 (DSMIPv6) provides the mechanism for the use of the IPv6 IP address when the UE is connected via IPv4 (in addition to IPv4 nodes) and to use IPv4 addresses in addition to IPv6 when the LE is connected to an IPv6 only network.

Similarly, the network needs to be able to control the mobility of a LE between different points of attachments. Thus, when a dual stack LE moves into a network which supports only a single IP version, current DSMIPv6 mechanisms result in increased header overhead and signaling overhead over the air.

Currently, there is no mechanism to support the combined network based and UE based mobility mechanisms. If the UE needs to support the dual stack mobility with the network supporting only one of the IP versions, there is no current mechanism to reduce the header overhead. Thus, there is a need in the art to provide a support mechanism for a combination of network controlled mobility and UE controlled mobility between different IP versions.

SUMMARY OF THE INVENTION

The invention provides a method for permitting access to nodes supporting both IPv4 and IPv6 on a network supporting only one of the IPVx versions. According to the present invention, both network based mobility and UE based mobility mechanisms are supported. The present invention advantageously allows a UE supporting dual stack mobility to access a network supporting only one of IPv4 or IPv6. The invention results in a reduction of header overhead and signaling overhead.

One of the advantages of the present invention is that UE need not be aware of the mobility. Also, the control of the UE between different points of attachment increases the location privacy, and reduces the header overhead and signaling overhead over the air.

The aforementioned and other exemplary objects, features and advantages of the present invention will become more apparent from the ensuing detailed description of the invention taken in conjunction with the accompanying drawings.

DETAILED DESCRIPTION

Figure 1:
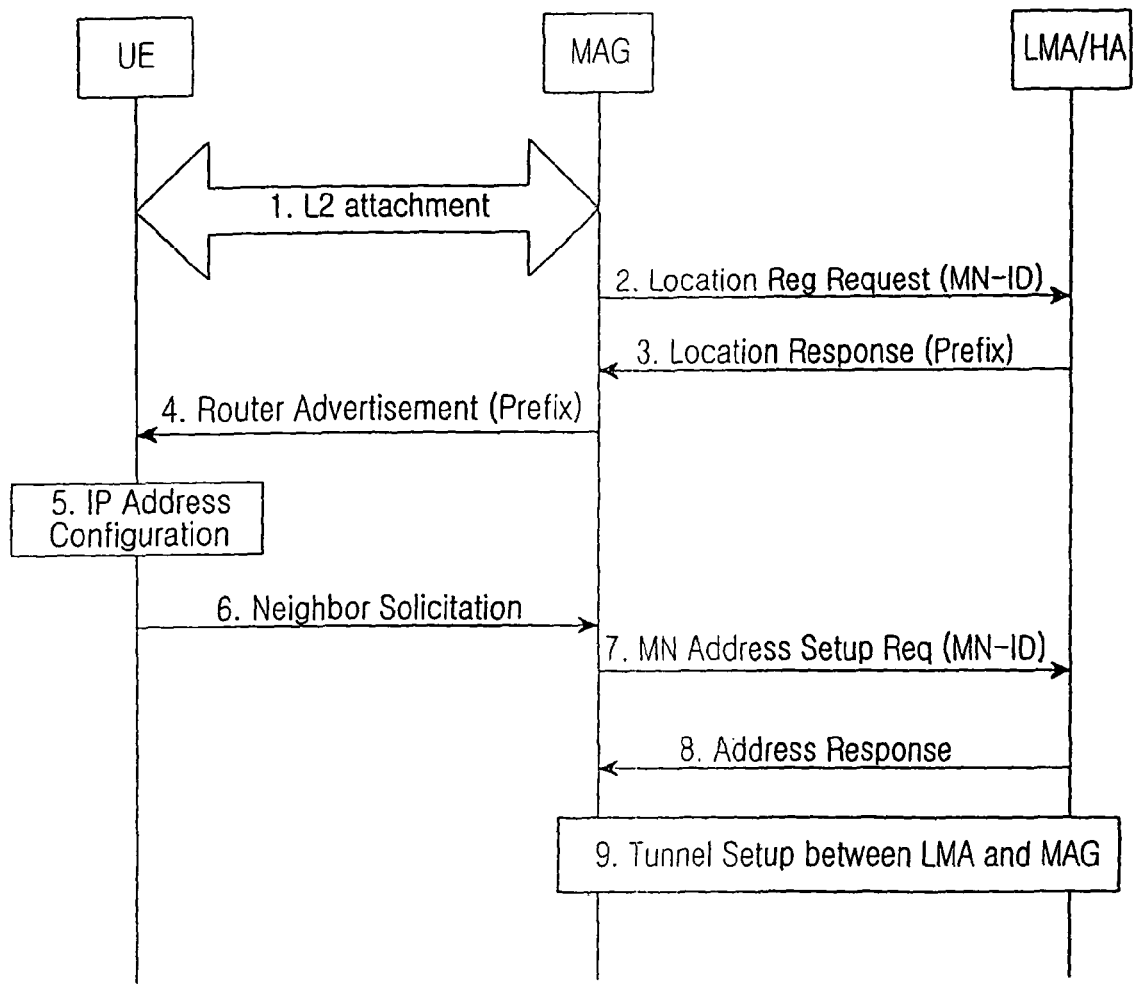
FIG. 1 depicts the flow for network based mobility mechanism when the UE powers-on in network mobility domain. During this procedure the AR registers the location of the UE with the HA.

The exemplary embodiments of the present invention will now be explained with reference to the accompanying drawings. It should be understood however that the disclosed embodiments are merely exemplary of the invention, which may be embodied in various forms. The following description and drawings are not to be construed as limiting the invention and numerous specific details are described to provide a thorough understanding of the present invention, as the basis for the claims and as a basis for teaching one skilled in the art how to make and/or use the invention. However in certain instances, well-known or conventional configurations are not described in order not to unnecessarily obscure the appreciation of the present invention by a person of ordinary skill in the art with such known configurations.

The present invention provides a system and method of providing Dual Stack mobility when network controlled mobility mechanism is used. The following glossary of abbreviations is provided to assist with an ease of understand the invention:

GLOSSARY OF TERMS AND DEFINITIONS THEREOF

AR: Access Router
BU: Binding Update
CoA: Care of Address
HA: Home Agent
HoA: Home Address
IPv4: Internet protocol version 4
IPv6: Internet Protocol version 6
MIP: Mobile IP
nAR: new AR
oAR: Old AR
UE: User Equipment
   Dual Stack Extension to MIP
   In this section we describe a mechanism that can be used for registration of the Home Address (HoA) of one IP version while sending the Binding to the Home Agent (HA) for another IP version.

For example, a registration of an IPv4 address using the Mobile Internet Protocol Version 6 (MIPv6) Binding Update is described herein below. However, a similar mechanism can be used for registration of IPv6 address by using Mobile Internet Protocol Version 4 (MIPv4) Registration Message. Herein below is a description of a number of different scenarios and an explanation of the operation according to the present invention.

Mobile IP typically uses two IP addresses, the first being a home address and the second being a care-of address that changes whenever the UE changes networks and the mobile. When the UE is connected to an IPv6 network, the UE configures the IPv6 address in the network to which it has been connected. This IPv6 address is the care of address (CoA) for MIPv6 binding. The UE also configures the IPv6 home address (HoA) using the MIPv6 mechanisms. UE now forms the MIPv6 binding update with the related extensions for registering the IPv4 HoA. We assume that the UE is not configured with the IPv4 home Address.

The Binding update (BU), which supplies a new binding to an entity that needs to know the new care-of-address for a UE, contains the IPv6 HoA. The BU also contains the IPv4 extensions which contains the IPv4 HoA. Since in this example the IPv4 HoA is not statically allocated, and UE does not know its HoA, the UE includes 0.0.0.0 in the HoA field.

When the HA receives the BU with IPv4 extensions, the HA allocates an IPv4 HoA for the UE. The HA adds two binding entries for the IPv6 CoA, one for IPv6 HoA and another for IPv4 HoA. Thus, any packet with a destination address as IPv6 HoA or IPv4 HoA will be tunneled to the IPv6 CoA.

In addition, when the UE is connected to an IPv4 network, a similar procedure as described above is followed. However the UE registers the IPv4 CoA in the BU. Also the BU is tunneled to the HA via IPv4 tunnel to the IPv4 address of the HA.

Thus, the UE is able to access both IPv4 as well as IPv6 applications and Nodes when connected to either IPv4 or IPv6 network.

Network Based Mobility Mechanisms

The network based mobility mechanism hides a change in the point of attachment from the UE. In the following section, we explain one possible mechanism for the hiding the change in point of connectivity from the UE.

The UE powers on in the network supporting network based mobility mechanism, and the router detects the L2 attach of the UE. The Router registers the UE with the Home Agent. The Home Agent registers the UE ID and informs the Router the prefix to be advertised. The UE can now configure an IP address based on this prefix by stateless or state full address configuration. Then the R1 informs the HA about the IP address configured by the UE. Whenever a packet arrives at the HA for the UE IP address, the packet is tunneled to the R1. R1 then transfers the packet over the L2 interface. Similarly, all the packets in the uplink direction are tunneled back to the HA.

When the UE moves from one Router to another within the same domain, the R2 authorizes the UE attach with the HA. The HA can inform the R2 of the prefix to be advertised, which is same as the previous prefix. As the UE the prefix has not changed, the LE assumes that it is still connected to the same point of attachment. Hence the IP Address is not reconfigured. However the R2 is registers in the HA for the given IP address. Hence onwards any IP packet arriving at HA for the UE will be tunneled to R2 instead of R1.

As shown in the FIG. 1, the sequence for Power-on Procedure when the UE attaches to the Network-based Localized Mobility Management (NETLMM) domain. Here, the Mobility Access Gateway (MAG) is a router with some additional facilities. A local mobility agent (LMA) is similar to a Home Agent that registers the binding between the UE IP address and the MAG IP address for the tunneling. LMA is also in the user plane path that tunnels the UE packet to the MAG.

With reference to FIG. 1, the steps are as explained below:
1. The UE attaches to the MAG at the L2 layer. MAG obtains the UE ID during this attach procedure.
2. The MAG sends Location Registration Request to the LMA with the UE ID.
3. The LMA decides on whether the UE shall be allowed to access the domain and if allowed sends the prefix to be advertised for the UE.
4. The LMA sends the router advertisement for the prefix as given by LMA.
5. The UE configures IP address based on the prefix. This can be either stateless or stateful address auto-configuration.
6. The UE sends IPv6 Neighbor solicitation as part of the Duplicate address detection.
7. The LMA now knows the address used by the UE. The LMA sends the UE-ID, IP address to the LMA in MN Address setup message.
8. The LMA checks whether this address has been bound to any other UE. If not, it configures the tunnel between LMA and MAG for the UE.
9. Now the tunnel is setup between the LMA and MAG for the given UE IP address. Any packet which arrives at the LMA for the given UE IP address will be tunneled to the MAG. The MAG detunnels the packet and tunnels it over L2 to the UE.

Figure 2:
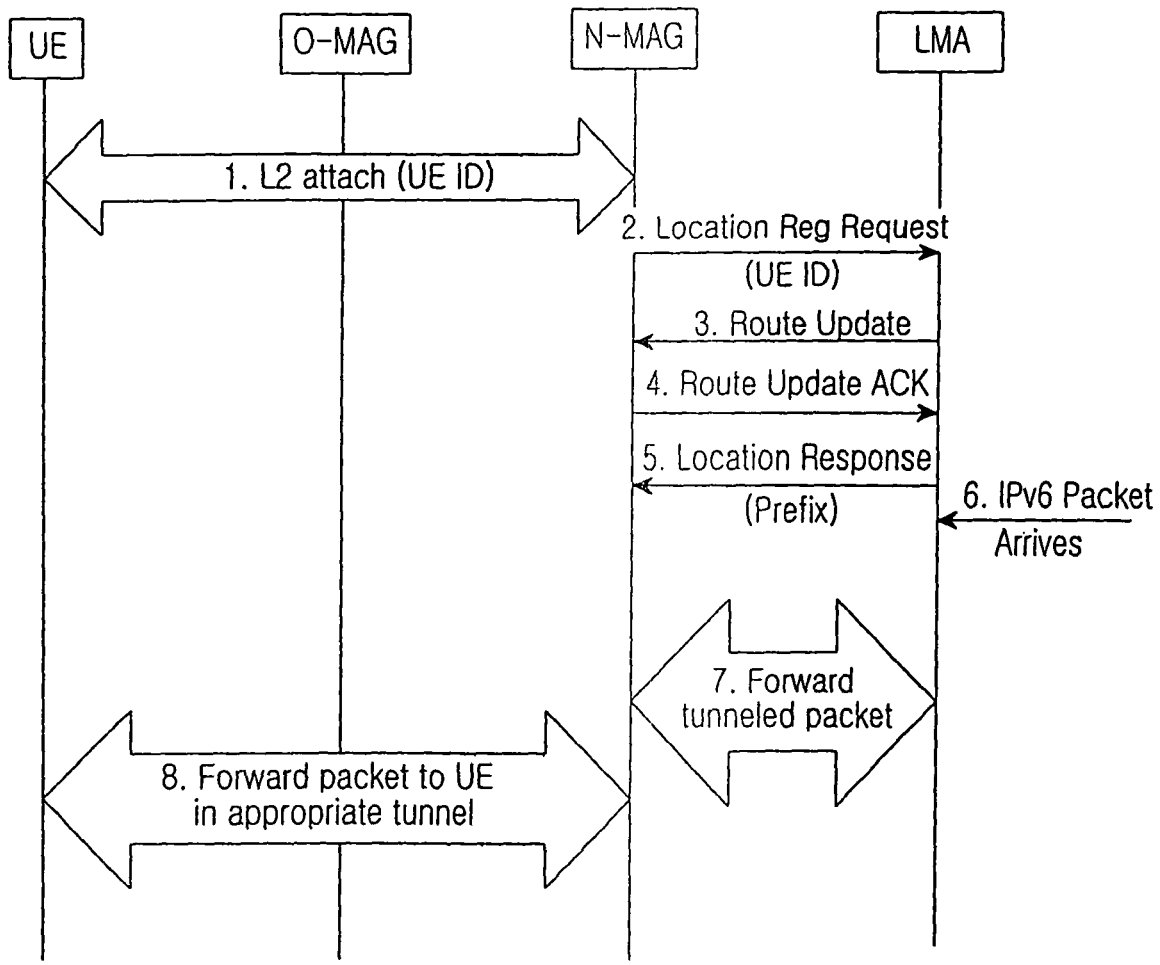
FIG. 2 depicts the flow for network based mobility mechanism when the UE changes the router within the network based mobility domain.

FIG. 2 shows the flow for network mobility when a UE moves from one router to another within the same domain. When the UE changes the point of attachment, the new AR registers the new location of the UE. The AR also advertises the same prefix as the UE's IP address. Hence, the UE does not reconfigure the IP address.

The flow is as explained below with reference to FIG. 2:
1. The UE attaches to the MAG at the L2 layer. MAG obtains the UE ID during this attach procedure.
2. The MAG sends the location registration message to the LMA.
3. The LMA recognizes that the UE has been attached through a different router. It sends route update message to the MAG.
4. The LMA configures the tunnel for the UE IP Address and responds back with acknowledgement.
5. Now the LMA sends Location Registration Acknowledgement with prefix to be advertised. Since the UE receives the same prefix as previously stored, hence the IP address does not change.

Figure 3:
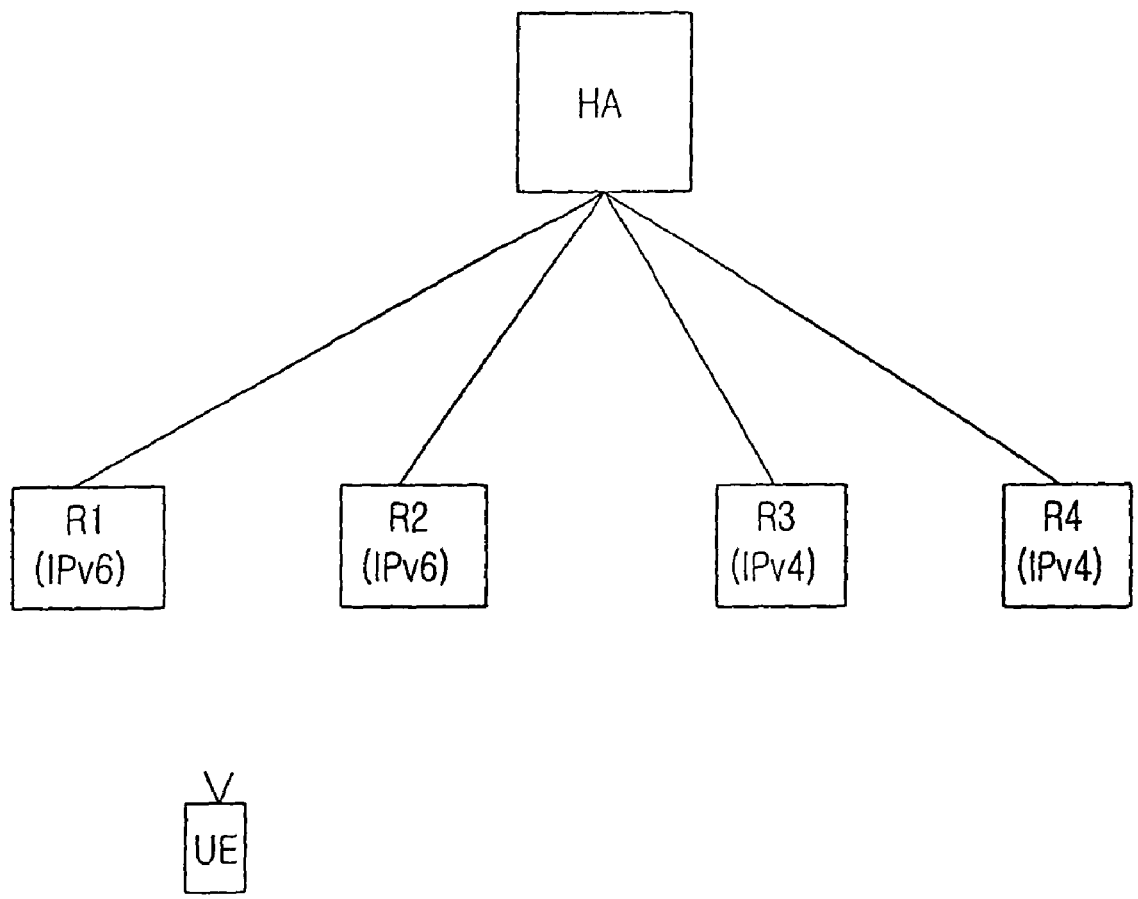
FIG. 3 depicts the topology of the network according to the present invention.

FIG. 3 depicts the topology of the network according to the present invention. The HA is dual stack, and so is the UE. The Access Routers (ARs) R1 and R2 support only IPv6 while R3 and R4 support only IPv4. The AR's support network based mobility mechanism for the IP version supported. However, the network, comprising of the routers R1 through R4, is single stack routers. The routers R1 and R2 are IPv6 only capable, while the routers R3 and R4 are IPv4 only capable.

An example of a combined Network Based and UE Based mobility across IP versions according to the present invention may operate as follows:
1. When the UE powers on in an IPv6 network, the UE attaches with the router R1 in L2 dependent manner. The router now advertises the network prefix which is assigned by the HA. This prefix can be obtained by the router when the UE connects to the network (L2 Attach).

2. Based on the prefix received, the UE forms an IPv6 IP address. This IP address is then registered at the HA along with the Router IP Address. This registration is done by the router. Now any packet for the UE is tunneled directly to the router.

3. The UE also has the IPv4 Home Address that can be statically assigned or assigned dynamically. The UE sends the MIPv6 BU with the IPv4 HoA in the IPv4 extensions. The IPv6 HoA option is empty, as the UE receives the same prefix as its home prefix.

4. When the UE moves from one router to another, the network manages the mobility for IPv6. Upon detection of an L2 attach of the UE, R2 contacts the HA, which informs the R2 the prefix which needs to be advertised. Also, HA switches the tunnel from R1 to R2. Also since the IPv4 HoA is bound to the IPv6 address, the MIPv6 BU is also not sent.

5. In HA, the IPv6 address is bound to IP address of the Router. Also, the IPv4 HoA is bound to the IPv6 IP Address of the UE. Hence whenever an IPv6 packet reaches the HA, it tunnels the packet to the router without any HA. When an IPv4 packet reaches the HA, the IPv4 packet is tunneled to IPv6 Address of the UE. However since the IPv6 address itself is tunneled to the Router, the tunneled packet is again tunneled to the router.

Hence, for IPv6 packet, the header's overhead is significantly less compared to the Dual Stack Mobility mechanism. In the case of IPv4, the overhead is same as in Dual Stack Mobility mechanism. Also network is in control of the mobility for the IPv6.

As shown in FIG. 3, an exemplary topology of the network includes an HA, which is connected to the routers. The routers R1 and R2 support only IPv6 network. The routers R1 and R2 also support the network supported mobility mechanism with the HA. HA supports MIPv6 registration with Dual Stack extensions.

Figure 4:
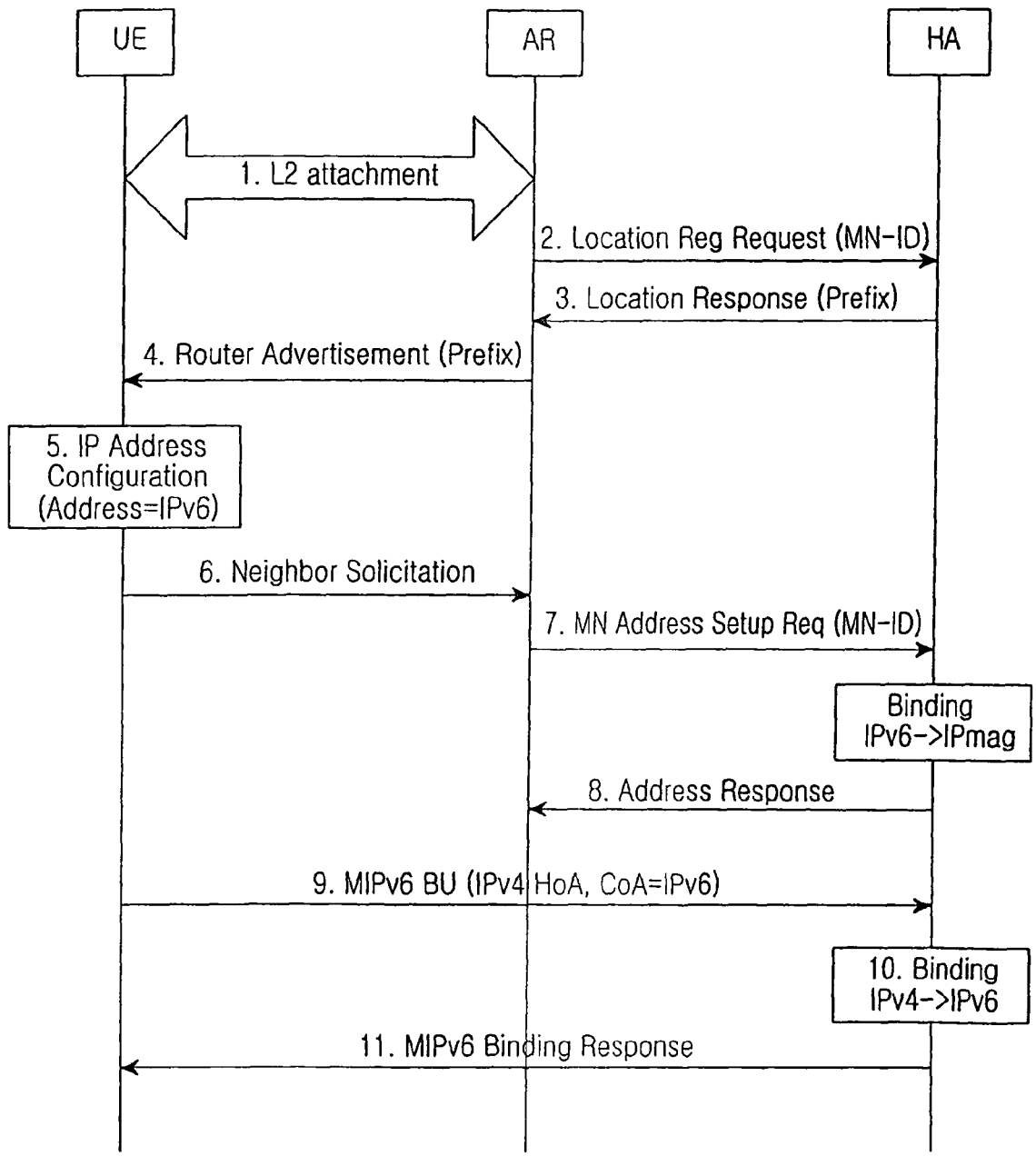
FIG. 4 depicts the flow for combined UE and network based mobility mechanism when the UE powers-on in network mobility domain according to the present invention.

FIG. 4 depicts the flow for combined UE and network based mobility mechanism when the UE powers-on in network mobility domain. In accordance with FIG. 4, and the procedure is as described as with reference to FIG. 4 below:

1. The UE attaches to the AR at the L2 layer. AR obtains the UE ID during this attach procedure.

2. AR sends Location Registration Request to the HA with the UE ID.

3. The HA decides on whether the UE shall be allowed to access the domain and if allowed sends the prefix to be advertised for the UE.

4. The AR sends the router advertisement for the prefix as given by HA.

5. The UE configures IP address based on the prefix. This can be either stateless or stateful address auto-configuration. Let the IP address be designated at IPv6.

6. The UE sends IPv6 Neighbor solicitation as part of the Duplicate address detection.

7. The AR now knows the address used by the UE. The AR sends the UE-ID, IP address to the HA in MN Address setup message. Now HA has binding for the IPv6 and the AR IP address.

8. The HA checks whether this address has been bound to any other UE. If not, it configures the tunnel between HA and AR for the UE.

9. UE generates an MIPv6 BU with HoA as IPv4 address, and CoA as IPv6.

10. The HA forms a binding entry between IPv4 and IPv6. Hence now any packet for IPv4 will be tunneled to IPv6.

11. HA responds back with the Binding response to UE. Now the User Plane setup is completed.

Figure 6:
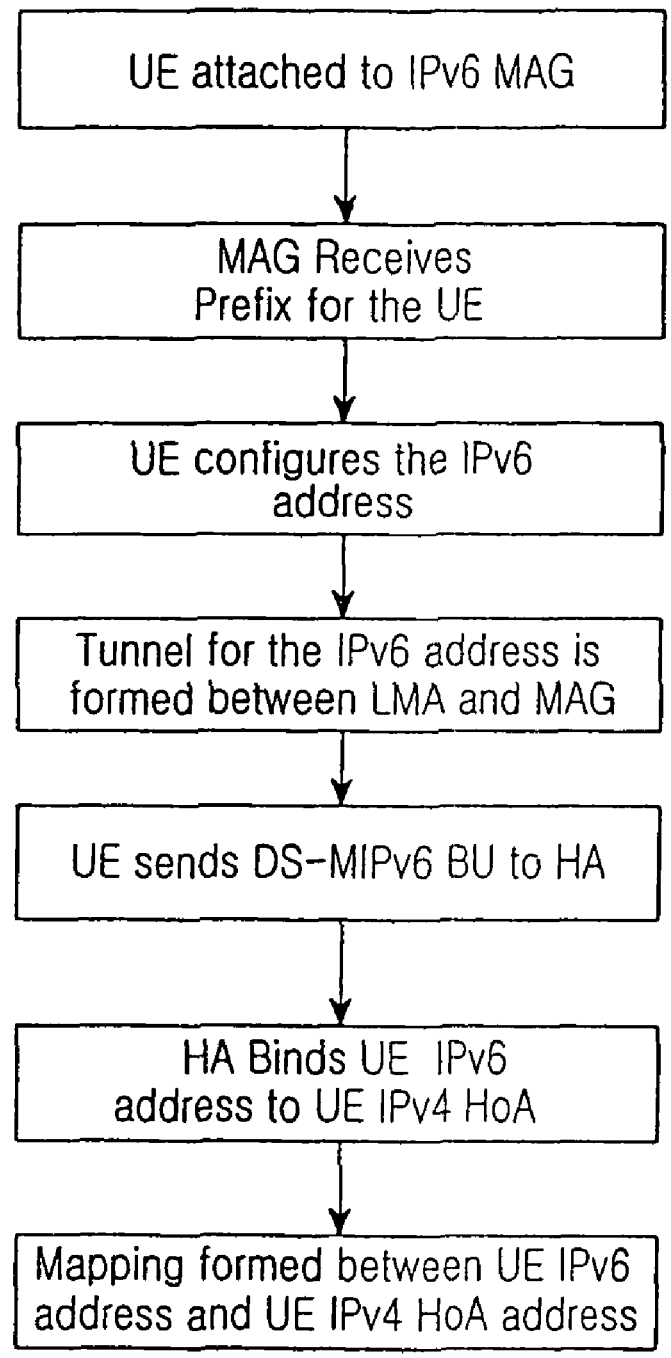
FIG. 6 depicts the decision flow diagram for the UE attaching to IPv6 only network.

FIG. 6 depicts a flow diagram for a UE attaching to IPv6 only network.

Data Transmission

1. When an IPv6 packet arrives at the HA for the UE IPv6 IP address, the packet is tunneled to R1. The R1 detunnels the packet and sends the IPv6 packet over the air. Hence there is no over the air header overhead.

2. When an IPv4 packet arrives at the HA for the UE IPv4 IP address, the packet triggers IPv6 tunneling protocol. Thus the IPv4 packet is tunneled to IPv6 IP address. Now the IPv6 packet is tunneled to the AR1. A R1 detunnels the IPv6 packet and L2 tunnel to the UE. The UE detunnels the IPv6 packet and delivers the IPv4 packet.

ILLUSTRATIVE EXAMPLE OF MOBILITY FROM IPv6 ONLY NETWORK TO IPv4 ONLY NETWORK

In accordance with the exemplary topology shown in FIG. 3, the HA and UE are dual stacked and support both IPv6 and IPv4 networks. The Routers are connected to the HA (possibly through intermediate routers) and support either only IPv6 or only IPv4.

In FIG. 3, the routers R1 and R2 support only IPv6, whereas routers R3 and R4 support only IPv4.

Figure 5:
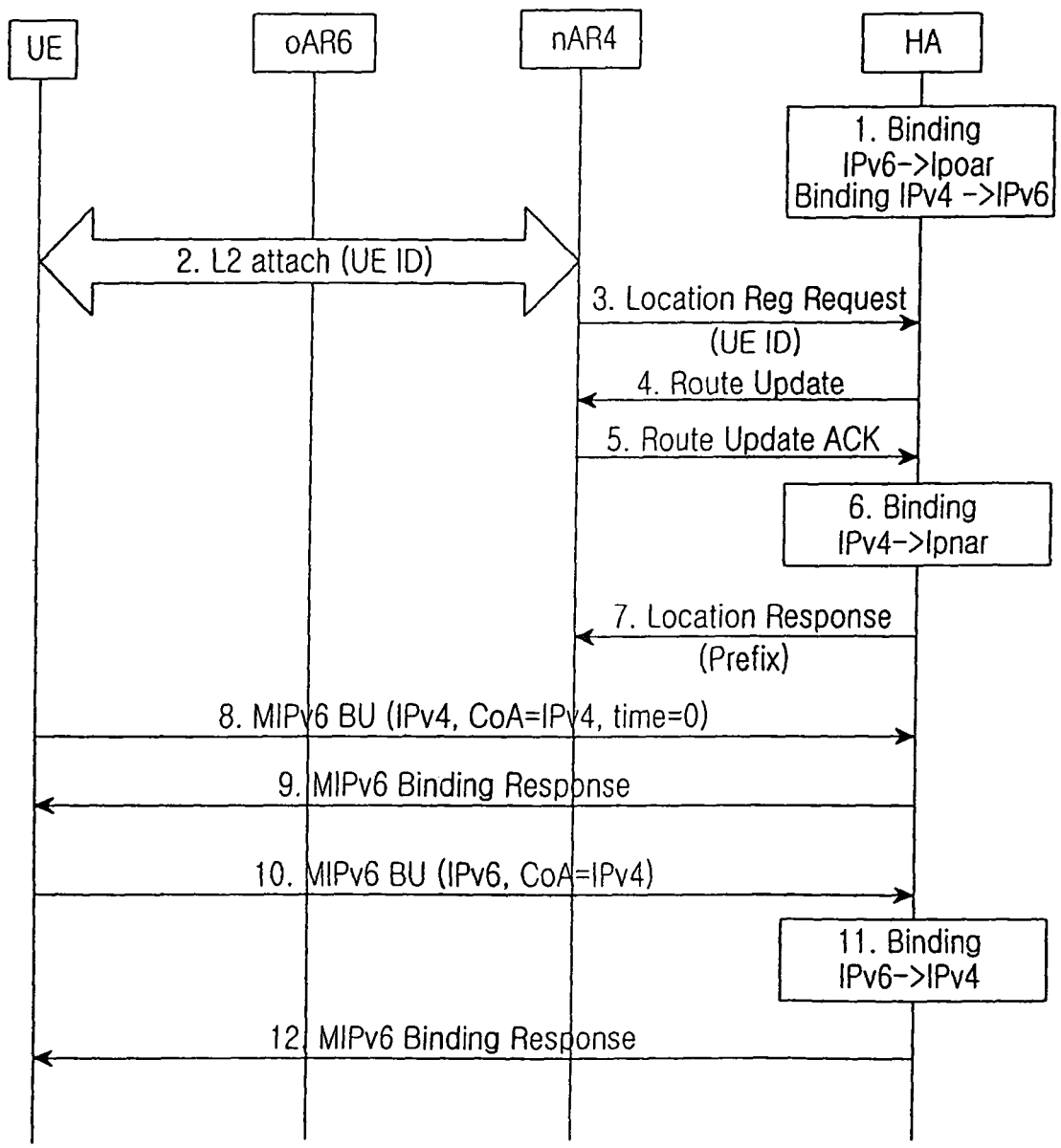
FIG. 5 depicts the flow for combined UE and network based mobility mechanism when the UE changes the router within the network based mobility domain.

For example, if the UE is in R2, it is connected through the IPv6 network. IPv4 address is registered with the HA. When the UE connects to Router R3, the network supports only IPv4. The procedure is as given below in accordance with FIG. 5:

1. The UE is connected through an Opportunistic Auto-Rate Media Access (oAR). OAR is an IPv6 node. Hence, the HA keeps the binding between IPv6 and oAR IP address for tunneling of the packets. The IPv4 is bound with IPv6.

2. The UE attaches to the new access router (nAR) at the L2 layer. The nAR obtains the UE ID during this attach procedure.

3. The nAR sends the location registration message to the HA.

4. The HA recognizes that the UE has been attached through a different router. It sends route update message to the nAR. Since the nAR is IPv4 capable, the route update is for the IPv4 address only.

5. The nAR configures the tunnel for the UE IP Address (IPv4 in this case) and responds back with acknowledgement.

6. The HA keeps the binding between the IPv4 and nAR IP address.

7. The HA sends Location Reg. Acknowledgement with prefix to be advertised. Since the prefix is same as the IPv4 HoA, the UE realizes that it has arrived in IPv4 home and needs to send deregistration message. However since the UE is IPv4 only network, it needs to send registration for the IPv6 address.

8-9. UE deregisters the IPv4 from the HA. Alternatively, the HA can perform this task when the nAR registers the UE in its domain.

10. The UE also sends MIPv6 BU to register IPv6 with the CoA as IPv4.

11. The HA keeps the binding between the IPv6 and Ipv4.

12 The BU response completes the protocol.

Subsequently, all the data will be tunneled to the IPv4 address of the Router and over L2 to the UE.

Figure 7:
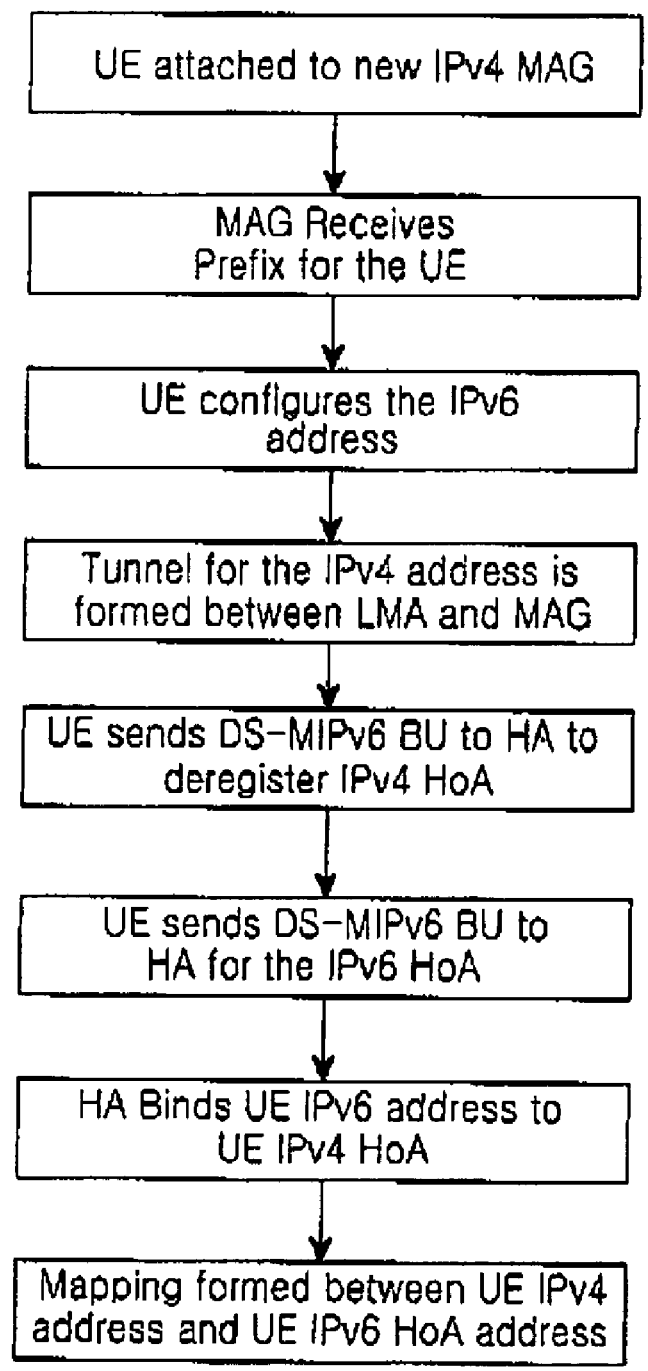
FIG. 7 depicts the decision diagram for UE moving from IPv6 only network to IPv4 only network.

FIG. 7 depicts a flow diagram for the UE moving to an IPv4 only network from an IPv6 only network.

According to the invention, the UE is able to send the DSMIPv6 BU, even though the UE is attached to the home network for another IP version. The UE is able to send multiple BU, one for deregistering the IP version supported by the network for Network based mobility and another for registering the IP address (HoA) of the unsupported IP version.

Some of the advantages of the present invention include: 1. Enabling Dual Stack mobility when the network supports network based mobility for one of the IP versions; and 2. Enabling the network to be in control of mobility for at least one IP version.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but not limited to a microchip, microprocessor, handheld communication device, computer, rendering device or a multi function device. While IPv6 and IPv4 have been shown in the foregoing examples, the spirit of the invention and the scope of the appended claims are not limited to those versions and can apply to other and subsequent IPvx and IPvy versions, and also to a situation where there are more than two versions.

Although the present invention has been fully described in connection with the preferred exemplary embodiments thereof with reference to the accompanying drawings, it is to be noted that various changes and modifications are possible and are apparent to those skilled in the art. Such changes and modifications are to be understood as included within the scope of the present invention as defined by the appended claims unless they depart there from.

We claim:

1. A method for combining network controlled mobility and User Equipment (UE) controlled mobility between different IP versions on a network supporting only one IP version, said method comprising:
   sending, by a first Access Router (AR1) supporting an Internet Protocol Version x (IPVx), a network prefix to a dual stack User Equipment (UE), said UE additionally having an Internet Protocol Version y (IPvy) Home Address (HoA);
   registering by AR1, at a dual stack Home Agent (HA), an IPvx IP address of the UE including the network prefix of the UE for tunneling packets for the UE by the network directly to AR1;
   receiving by AR1, a Dual Stack-Mobile Internet Protocol version 6 (DS_MIPv6) Binding Update (BU) containing the IPvy HoA in the IPvy extensions;
   detecting movement of the UE by an L2 attachment to a second Access Router (AR2), said AR2 requesting from the HA the network prefix assigned to the UE;
   switching, by the HA, the tunneling of packets for the UE from AR1 to AR2;
   binding, by the HA the IPvx address of the UE to an IP address of AR2 and binding the IPvy HoA to the IPvx address of the UE; and
   tunneling, by the HA, IPvx packets to AR2, and tunneling IPvy packets to the IPvx address of the UE.

2. The method as claimed in claim 1, further comprising providing access to nodes supporting both IPvx and IPvy, wherein said network supporting only one of the IP versions IPvx and IPvy by said HA tunneling IPvx packets using the IPvx address of the UE.

3. The method as claimed in claim 1, wherein IPvx comprises Internet Protocol Version 6 and IPvy comprises Internet Protocol Version 4.

4. The method as claimed in claim 1, wherein the UE sends a Dual Stack-Mobile Internet Protocol version 6 (DS-MIPv6) Binding Update BU with the HoA of an unsupported IPvy version.

5. The method as claimed in claim 2, wherein the HoA option of the supported IPvx version is empty as the UE has received the same IP address by the network based mobility scheme.

6. The method as claimed in claim 2, wherein when the UE moves from one router to another supporting the same IP version, while the network manages the mobility for an unsupported IPvy version.

7. The method as claimed in claim 1, wherein upon detection of an L2 attach of the UE, AR2 contacts the HA which provides to the AR2 the prefix/address for advertising/allocating and the HA switches the tunnel from AR1 to AR2, and wherein the Dual Stack-Mobile Internet Protocol version 6 (DS-MIPv6) BU is not sent.

8. The method as claimed in claim 2, wherein in the HA, the IP address of the supported version is bound to IP address of the Router and the HoA of the unsupported IP version is bound to the IPv6 IP Address of the UE.

9. The method as claimed in claim 1, wherein when the UE moves from one router supporting one IP version to another router supporting another IP version, the network manages the mobility for both the IP versions.

10. The method as claimed in claim 2, wherein the UE serially sends Dual Stack-Mobile Internet Protocol version 6 (DS-MIPv6) BU to deregister the IP address of the version supported in a new system, and sends the DS-MIPv6 BU to bind the IP address of version not supported in the new system to the IP address of the supported IP version received by the network based mobility mechanism.

11. A system for combining network controlled mobility and UE controlled mobility between different IP versions on a network supporting only one of the IP versions, comprising:
   a dual stack Home Agent (HA) for providing a prefix of a particular User Equipment (UE):
   a first Access Router (AR1) supporting only an Internet Protocol Version x (Ipvx) in communication with the HA and for receiving the prefix from the HA;
   a second Access Router (AR2) supporting only an Internet Protocol Version y (Ipvy) in communication with the HA;
   wherein as the particular UE moves and connects with AR2, the HA provides the prefix of the particular UE to AR2, so that the particular UE sends a binding update to the HA and the HA binds an Ipvx address of the UE to an IP address of AR2 and binds the Ipvy Home Address (HOA) to the Ipvx address of the UE and the HA tunnels Ipxv packets to AR2, and tunnels Ipvy packets to the Ipvx address of the UE.

12. The system as claimed in claim 11, wherein the network provides access to nodes supporting both IPvx and IPvy, and supports only one of the IP versions IPvx and IPvy by said HA tunneling IPvx packets using the IPvx address of the UE.

13. The system as claimed in claim 11, wherein the IPvx comprises Internet Protocol Version 6 and the IPvy comprises Internet Protocol Version 4.

14. The method as claimed in claim 11, wherein the UE sends a Dual Stack-Mobile Internet Protocol version 6 (DS-MIPv6) Binding Update BU with the HoA of an unsupported IPvy version.

15. The system as claimed in claim 11, wherein the HoA option of the supported IPvx version is empty as the UE has received the same IP address by the network based mobility scheme.

16. The system as claimed in claim 11, wherein when the UE moves from one router to another supporting the same IP version, while the network manages the mobility for an unsupported IPvy version.

17. The system as claimed in claim 11, wherein upon detection of an L2attach of the UE, AR2 contacts the HA which provides to the AR2 the prefix/address for advertising/allocating and the HA switches the tunnel from AR1 to AR2, and wherein the Dual Stack-Mobile Internet Protocol version 6 (DS-MIPv6) BU is not sent.

18. The system as claimed in claim 11, wherein in the HA, the IP address of the supported version is bound to IP address of the Router and the HoA of the unsupported IP version is bound to the Ipv6 IP Address of the UE.

19. The system as claimed in claim 11, wherein when the UE moves from one router supporting one IP version to another router supporting another IP version, the network manages the mobility for both the IP versions.

20. The system as claimed in claim 11, wherein the UE serially sends Dual Stack-Mobile Internet Protocol version 6 (DS-MIPv6) BU to deregister the IP address of the version supported in a new system, and sends the DS-MIPv6 BU to bind the IP address of version not supported in the new system to the IP address of the supported IP version received by the network based mobility mechanism.

* * * * *